Feb. 6, 1923.

S. S. THOMAS.
STOVE AND THE LIKE.
FILED FEB. 18, 1921.

Inventor:
Stephen S. Thomas

Feb. 6, 1923.

S. S. THOMAS.
STOVE AND THE LIKE.
FILED FEB. 18, 1921.

Inventor:
Stephen S. Thomas
Attys

Feb. 6, 1923.
S. S. THOMAS.
STOVE AND THE LIKE.
FILED FEB. 18, 1921.
1,444,013
8 SHEETS-SHEET 3

Inventor:
Stephen S. Thomas

Feb. 6, 1923.
S. S. THOMAS.
STOVE AND THE LIKE.
FILED FEB. 18, 1921.

S. S. THOMAS.
STOVE AND THE LIKE.
FILED FEB. 18, 1921.

Inventor:
Stephen S. Thomas

Feb. 6, 1923.

S. S. THOMAS.
STOVE AND THE LIKE.
FILED FEB. 18, 1921.

1,444,013

Inventor
Stephen S. Thomas

Patented Feb. 6, 1923.

1,444,013

UNITED STATES PATENT OFFICE.

STEPHEN S. THOMAS, OF NEW ORLEANS, LOUISIANA.

STOVE AND THE LIKE.

Application filed February 18, 1921. Serial No. 446,006.

*To all whom it may concern:*

Be it known that I, STEPHEN S. THOMAS, a citizen of the United States, residing at New Orleans in the parish of Orleans and State of Louisiana, have invented certain new and useful Improvements in Stoves and the like, of which the following is a specification.

This invention has to do with certain improvements in stoves and the like. More particularly it has to do with improvements in stoves which are provided with coverings of heat insulating material to thereby better retain the heat within the interior of the stove. More particularly the invention relates to a device of this kind in which the interior of the stove may be initially heated by the generation of heat on its interior, this heat being conserved by the heat insulating material, so that after the desired temperature has been attained, the subsequent operation may be conducted simply by the use of the heat so generated and retained within the device.

There have in the past been devised a number of stoves or heaters operating on the general principle mentioned above. However, it has been found very difficult and in many cases impossible to secure a uniform heat action in all portions of the oven. This has been true largely by reason of the fact that the heating gases were not properly distributed with respect to the different portions of the oven structure. It is well understood that there is ordinarily a tendency for the greatest heat to concentrate in the rear portion of the oven so that cooking articles placed in said rear portion will frequently become burned or over cooked before articles in the front portion of the oven are properly cooked. One of the objects of the present invention is to provide a construction by means of which a very uniform heat action may be secured throughout the entire oven body.

Another feature of the invention has to do with the provision of a construction which will be very well adapted for heating by means of different kinds of fuel, such as gasoline, kerosene, gas, and other fuels. It is well understood that the products of combustion of some fuels are much heavier than the products resulting from the combustion of other fuels. In fact, the products of combustion of some fuels are heavier than air, whereas the products from the combustion of other fuels are lighter than air. A stove which will operate properly with one kind of fuel will not necessarily operate properly with another kind of fuel, because of this difference in the weight or specific gravity of the products of combustion. This is particularly true where the movement of the hot gases or products of combustion is occasioned solely by natural draft. The hot products of combustion from one fuel may circulate properly through the heating passages, whereas the products of combustion from another fuel may not circulate at all on account of the difference in weight or specific gravity of the two classes of products of combustion.

Another feature of the present invention has to do with the provision of an arrangement whereby the circulation of the products of combustion through the heating flues may be modified or changed according to the kind of fuel which is being consumed, so that a proper circulation of the heating gases may be secured at all times, regardless of what kind of fuel is being used.

Another feature of the invention has to do with the mechanical construction of the stove, and the main object of this feature is to provide a construction such that the device may be manufactured in a very simple manner from blanks or sheets of metal which may be cut or stamped out and assembled in a very simple manner and at comparatively low expense.

Another feature of the invention has to do with the provision of an oven of sectional form so that it may be built in standard units which may be readily set together; and when so set together will properly co-operate with each other although the units may occasionally be used individually, or in different combinations. In this connection, another object is to provide units for oven sections, or for broiling sections, and also to provide suitable base sections and other sections to co-operate therewith, so that if desired, these units may be set together to provide various combinations of oven sections alone, or oven sections in combination with broiling sections, or other combinations which will readilly suggest themselves to the user, some of which will appear from a detailed description and specification to follow:

In connection with the foregoing features, another object is to provide a very convenient mechanical construction and arrangement so that when the units are used they may very easily be set together into a strong structure, and to so form the units that they will maintain their proper assembly relationship against such forces as may naturally come upon them tending to displace them with respect to each other.

Other objects and uses of the invention will appear from a detailed description of the same which consists in the features of construction and combinations of parts hereinafter described and claimed.

Figure 6:
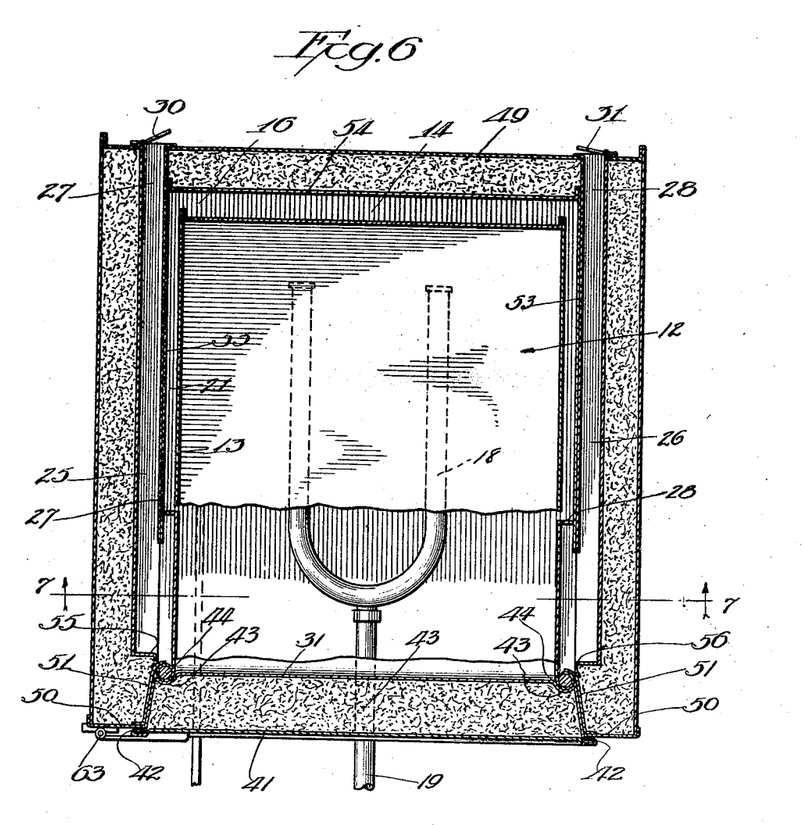
Fig. 6 is a horizontal section taken on the line 6—6 of Fig. 5 looking in the direction of the arrows.
Figure 7:
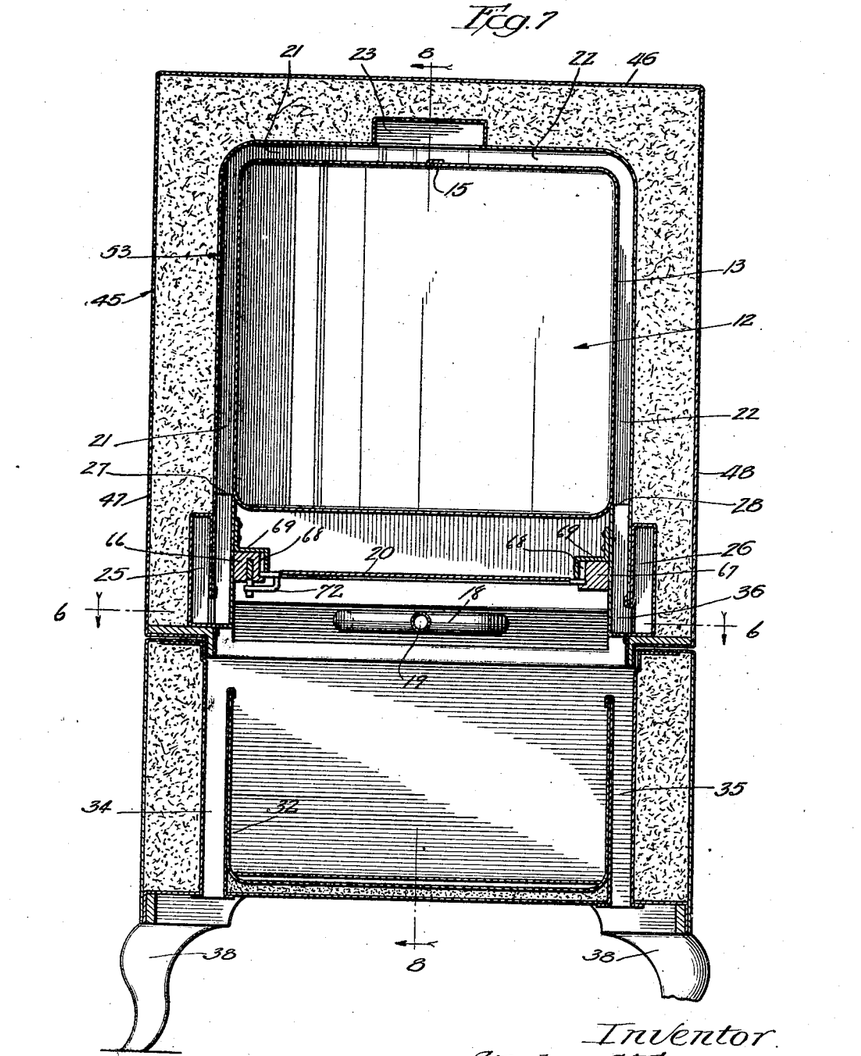
Fig. 7 shows a view similar to that of Fig. 5, with the exception that a broiler section has been substituted for the lower oven section.
Figure 8:
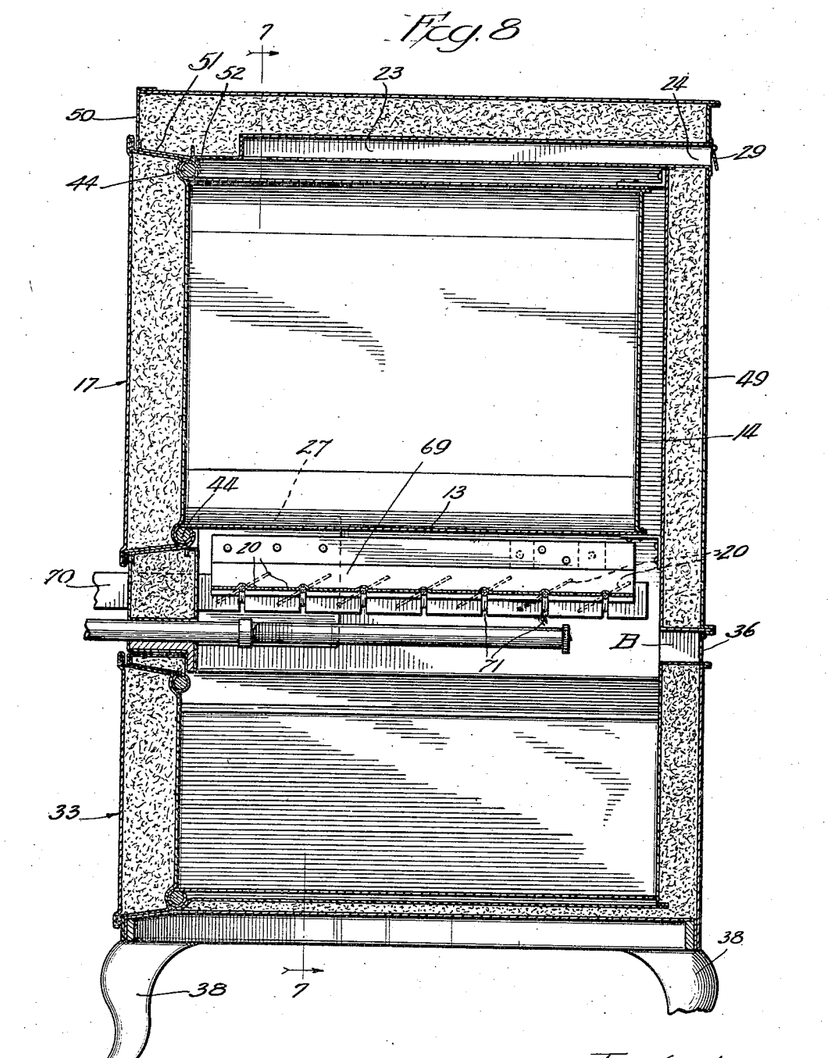
Fig. 8 shows a section taken on the line 8—8 of Fig. 7 looking in the direction of the arrows.

Referring first to Figs. 6, 7 and 8, I will describe the arrangement of passages for heating gases therein illustrated, and the general arrangement of the sheets from which the oven structure is built, and will then explain more in detail the other features of the invention.

In the construction shown in these figures there is provided a cooking oven 12 which consists of an encircling sheet 13 in conjunction with a back closing sheet 14. The encircling sheet may consist of a single long strip of sheet metal having its end portions flanged together along the line 15, and this line of joinder is preferably located on the upper side of the oven structure where it will be least subjected to the hot gases. The back sheet 14 may be conveniently held in place in any suitable manner, as by stamping it into shape to provide a rearwardly extending flange 16 which seats snugly into the rear edge of the encircling sheet 13, and to which it may be secured in any suitable manner as by spot welding.

A door 17 is provided for the front side of the oven, which door when closed provides a practically air tight connection with the oven chamber so that steam generated within the chamber will be retained in a more or less perfect manner, so that the heating gases will be very effectively prevented from entering the chamber. The detailed construction of these parts will be explained presently.

Suitable means are provided for heating the oven 12, and such means may operate either with gas or electricity or in any suitable manner. In the arrangement illustrated this heating means takes the form of a gas burner 18 receiving its gas through a pipe 19, the burner being located below the oven chamber 12. It will ordinarily be desired to prevent a direct contact of the flame of such burner with the metal of the oven so that to prevent excessive heat of the oven floor in spots. I have therefore provided a false bottom or baffle plate beneath the oven against which the direct flame of the burner impinges. I have also illustrated this baffle plate as being adjustable so that it may be made more or less effective for the purpose of more or less controlling the baffling action. The arrangement illustrated comprises a series of baffle plates 20 as shown in Fig. 8 which can be simultaneously rocked on the horizontal bearings so that they may be either brought into horizontal alignment, or may be tilted in order to establish a series of openings between them, the size of which openings may be regulated by the amount of such tilting. I will presently explain the construction of these parts more in detail.

As the heating gases pass upward they find their way into the upwardly extending passages 21 and 22 located adjacent to the central and upper portions of the oven chamber, these passages extending over the top of the oven chamber as shown in Fig. 7, these passages in turn communicate with another rearwardly extending passage 23 which may conduct the gases to a discharge point at its rear end 24, as shown in Fig. 8.

Extending along the sides of the lower portion of the oven are the passages 25 and 26 whose rear ends 27 and 28 may communicate with the outside atmosphere. The front portions of these passages 25 and 26 communicate with the lower front portions of the passages 21 and 22, the arrangement being such, however, that in order for the gases to flow from the passages 21 and 22 to the passages 25 and 26, it is necessary for said gases to first rise over the upper edges of the partitions 27 and 28. It will be observed that the openings into the passages 25 and 26 are on a line at a lower elevation than the flame from the burner 18, so that there may be a natural tendency for the gases to flow into the passages 25 and 26 when said gases are heavier than air.

The passage 23 or the passages 25 and 26 are intended to be used selectively depending upon the relative specific gravity of the heating gases as compared to air. When said gases are lighter than air, it is intended to allow them to circulate upwardly and be discharged through the top passage 23; but when they are heavier than air, it is intended to allow them to fall and be discharged through the side passages 25 and 26. In this way the stove is very well adapted for use on either of the two classes of fuel above mentioned. In order to more perfectly control this operation, suitable dampers may be provided for the passage 23 and for the passages 25 and 26, and I have illustrated such dampers at 29 for the passage 23, and at 30 and 31 for the passages 25 and 26.

In those cases in which a broiler section is located beneath the above section, said broiler section may be provided with a U-shaped pan or member 32, as shown in Fig. 7, a door 33 being in advance thereof and giving access thereto. The top portion of this U-shaped section is open and permits the heat from the burner to radiate directly down into the broiler section so that it gives a true broiling action. For this purpose, the top of the broiler section and the bottom of the oven section are open as shown in Figs. 7 and 8, giving direct communication between their interiors. At the sides of the U-shaped member 32 of the broiler section are the air passages 34 and 35, which supply the air to the burner, the lower ends of said passages being open to the atmosphere as shown in Fig. 7.

Figure 5:
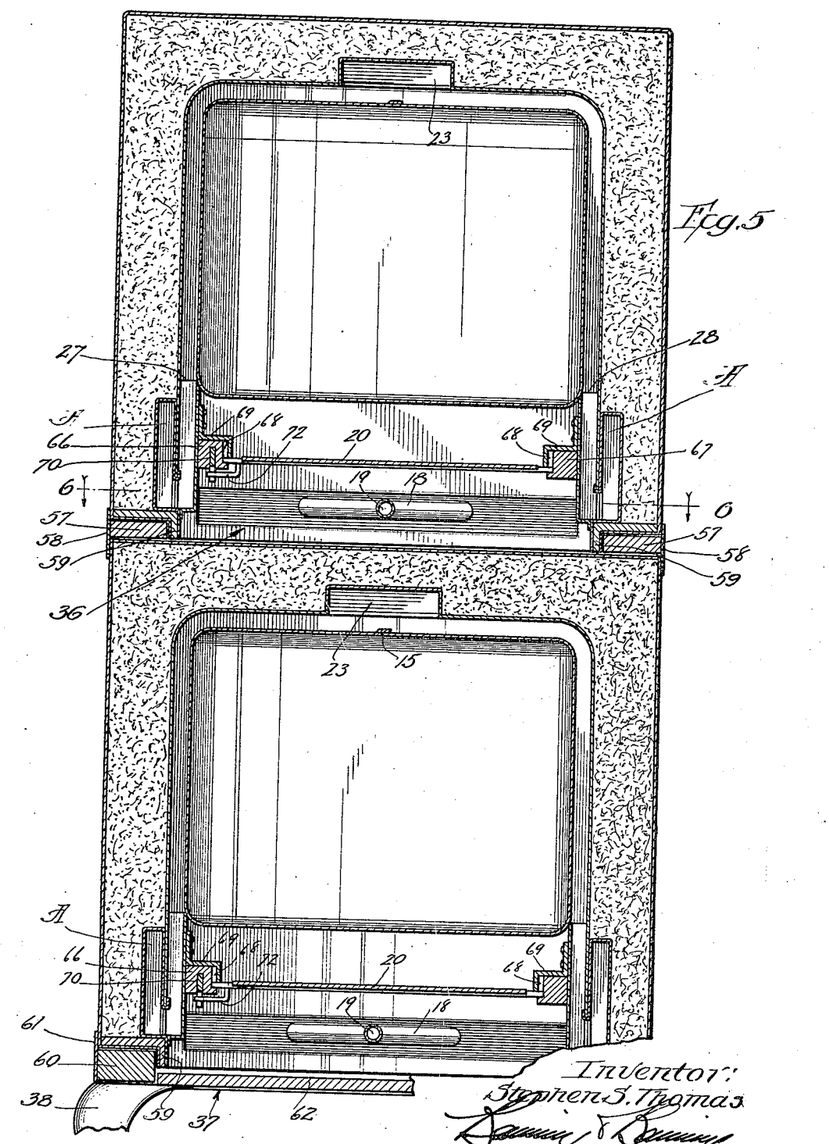
Fig. 5 shows a vertical cross section through a pair of oven section set together one on top of the other.

When two oven sections are superimposed on each other as illustrated in Fig. 5, the lower oven section would cut off or close the bottom of the upper oven section and prevent the entrance of air to the burner of the upper section. I have, therefore, illustrated a door 36 extending along the lower rear portion of the upper oven section, which door may be swung on a horizotnal axis as shown in Fig. 8, in order to admit air to the oven burner in those cases in which the air cannot rise from below.

Figure 1:
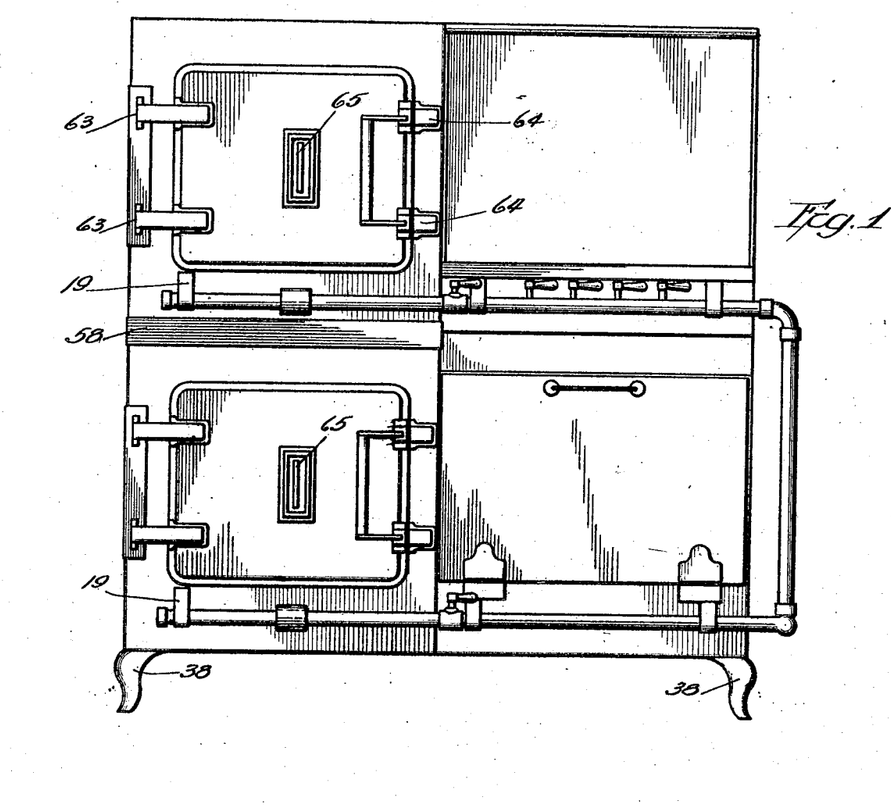
Figure 1 shows a front elevation of a number of stove units set together and embodying the features of the present invention, the units shown in Fig. 1 including two oven sections, a warming oven section, and an open burner hooded section.
Figure 2:
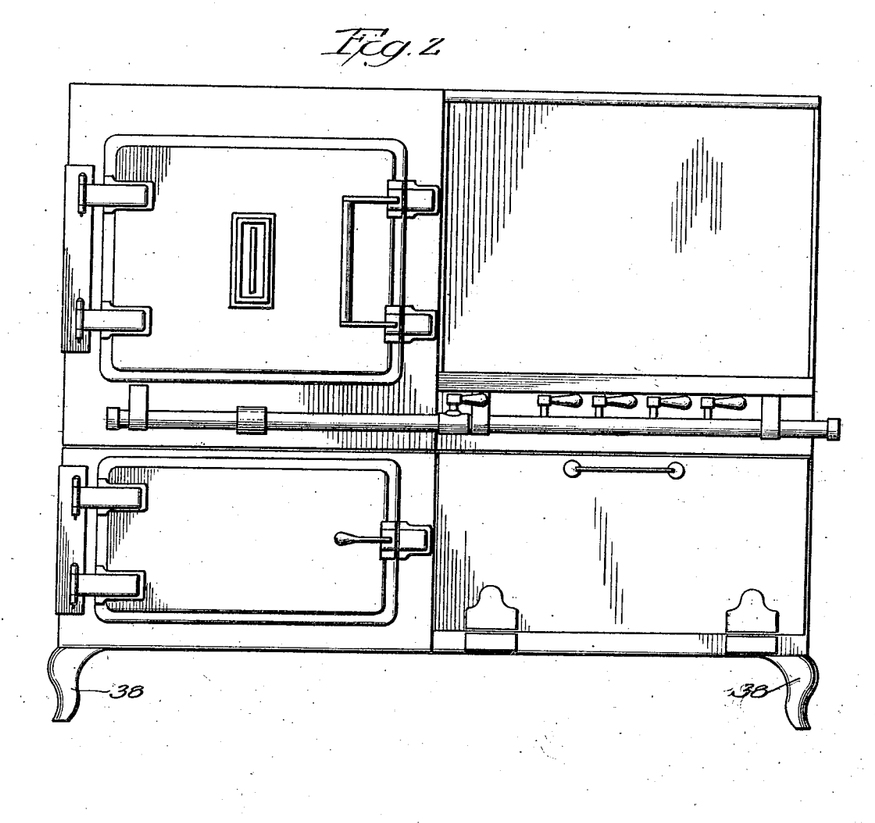
Fig. 2 shows a view similar to that of Fig. 1, with the execption that it illustrates an oven section, a broiler section, a warming oven section, and an open hooded section set together.
Figure 3:
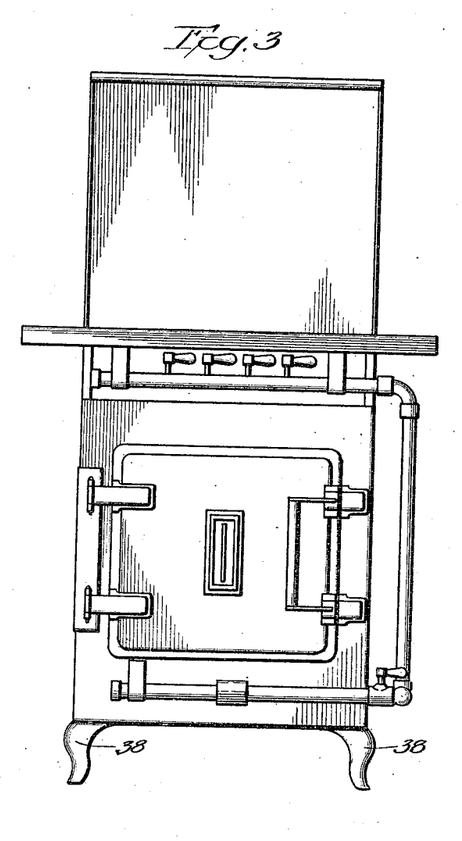
Fig. 3 shows a view similar to that of Figs. 1 and 2, with the exception that it illustrates only an oven section and an open burner hooded section set together.
Figure 4:
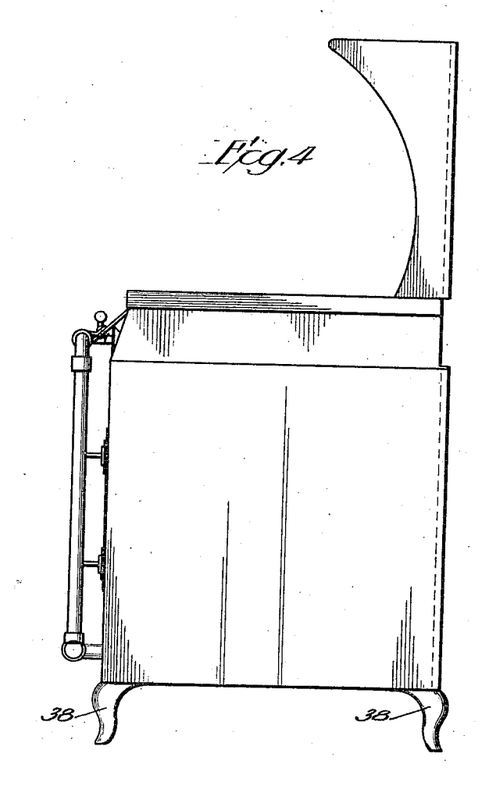
Fig. 4 is a view taken at right angles to Fig. 3.

The various sections are built up as cooperating units which may be set together as hereinbefore mentioned. For this purpose, I have provided suitable interlocking constructions between the various units, and I also provided a suitable base unit designated 37. This base unit has suitable legs or pedestals 38, by which it is supported above the floor a convenient distance. In some cases, the base unit will be of the same size as the oven or broiler units, as illustrated in Figs. 3, 4 and 8, whereas in the other cases the base units will be additionally large enough to accommodate other units alongside of the usual broiler and oven units, as shown in Figs. 1 and 2. Such other units when used may include heater sections or open burner sections; and in fact, open burner sections may also be used in direct conjunction with oven sections as illustrated in Figs. 3 and 4. In fact a large number of combinations may be worked out to meet individual needs of the user, or the wishes of the designer.

I will now describe the details of the embodiments of my invention illustrated in the drawings. As previously explained by reference to Figs. 6, 7 and 8, the typical oven unit includes an oven member into the front end of which seats the door 17. This door is shown as comprising a dish or pan of sheet metal 39 whose peripheral portion 40 is flanged outwardly, and to the front edge of which is attached a cover sheet 41 by flanging over the edge 42 of the peripheral portion 40. The space so enclosed may be filled with heat insulating material, or may comprise simply an air space as desired.

Around its inner edge portion the door is provided with a recess or depression 43, as well illustrated in Figs. 6 and 8, and the front edge portion of the oven sheet 13 is curled as shown at 44 so as to provide a more or less flexible edge for the front portion of the sheet 13. Sufficient flexibility is thus secured in the front edge of the oven sheet to permit a slight amount of deflection when the door is closed, thus ensuring a tight contact around the entire periphery.

A construction similar to that just described is provided in conjunction with the peripheral portion of the sheet 32 which constitutes the sides and bottom of the broiler.

By reason of this fact, a tight connection is established between the broiler and the door 33 which closes the front portion of the broiler.

An enclosing space is provided around the oven and its passages, and around the broiler and its passages, which space may be filled with heat insulating material such as kieselguhr, or other suitable substance. I will now describe the arrangements for providing this space in the case of a typical oven. Referring to Fig. 7, there is illustrated an inverted U-shaped sheet 45 which constitutes the top 46 and the sides 47 and 48 of the oven unit. A back sheet 49 is also provided for the oven unit, the peripheral portion of said back sheet being flanged outwardly and seated into the inverted U-shaped sheet to which it may be secured by spot welding or otherwise as desired.

A front sheet 50 is provided for the oven section, and the peripheral portion of this front sheet may be turned down over the front edges of the inverted U-shaped sheet in the manner clearly illustrated in Figs. 6 and 8.

A more or less rectangular section 51 surrounds the oven door opening having its front edge welded or otherwise secured to the front sheet 50, and its rear edge 52 curled inwardly as clearly illustrated in Figs. 6 and 8, so as to engage the front edge portion 44 of the oven sheet in a flexible manner. This sheet 51 is also tapered as clearly illustrated in Figs. 6 and 8 so that when the oven door 17 is forced home, it will seat snugly into the door opening.

The passages 21 and 22 at the sides of the oven and the continuation passage at the back of the oven are provided in the following manner: An inverted U-shaped sheet 53 of somewhat greater size than the oven itself is set down over the oven, and the clearance provided by reason of its larger size establishes the passages at the sides and top of the oven. A back sheet 54 is seated within this U-shaped sheet 53 and is spaced away from the back sheet of the oven 14 a sufficient distance to provide the continuation passage previously mentioned.

The passages 25 and 26 may be constituted in any convenient manner, as by means of sheets specially formed to provide them. Such sheets may be secured against the outside faces of the vertical legs of the sheet 53 in any suitable manner as by means of spot welding. The front portions of the sheets constituting the passages 25 and 26 may be turned over into engagement with the sheet 51 as shown at 55 and 56 in Fig. 6, so as to close the front ends of the passages 25 and 26 and so as to take advantage of the flexibility of the construction thereby established.

I will now describe more in detail the construction herein illustrated for registrating units with respect to each other and for enabling the designer or user to set the additional units into position on each other so as to provide a firm and substantial combined structure.

It is evident from the previous descriptions that the top portion of each oven section is closed by the top sheet 46. It is also evident that the lower portion of each oven section is open. In order, therefore, to align two oven sections when they are to be placed one on the other, I have provided the construction shown in Fig. 5 and in detail in Fig. 9. This arrangement includes a bar 57 of the same outside size as the front and size portions of the oven units, to which bar is secured a vertical plate 58 of such size as to overlap the upper and lower faces of the bar. This plate 58, shown also in Fig. 1, will hang down beneath the top of the lower oven unit and embrace the same as clearly shown in Fig. 9 so as to keep the bar 57 in proper alignment.

Figure 9:
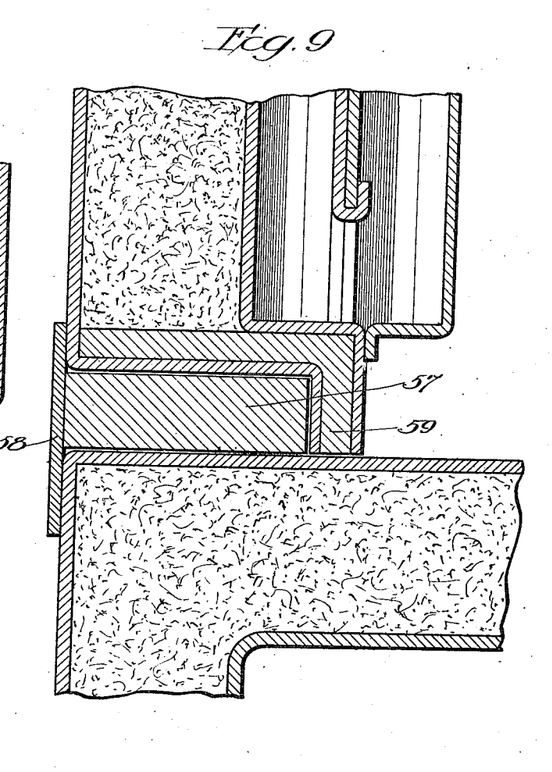
Fig. 9 shows an enlarged detailed fragmentary view of a portion of two superimposed oven sections.
Figure 10:
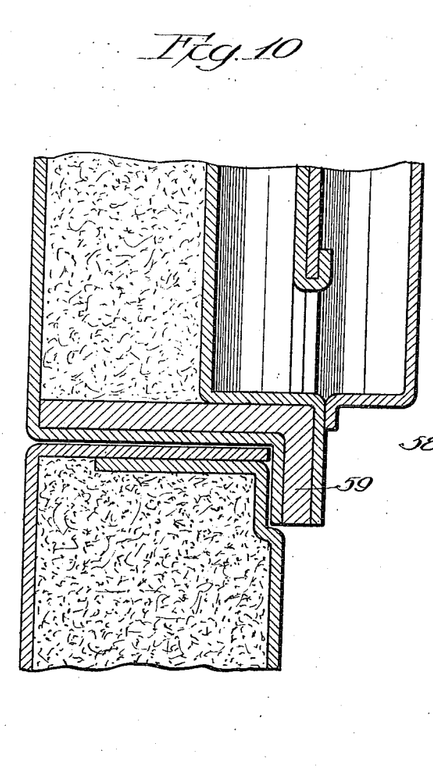
Fig. 10 shows a view similar to that of Fig. 9, with the exception that it illustrates an oven section superimposed on a broiler section.

The lower portions of the plates of the oven units are carried inwards and then turned down as shown at 59 in Figs. 5 and 9, so as to seat against the inner face of the bar 57. At the same time the upper edge of the plate 58 extends high enough to embrace the lower portion of the upper oven structure and thus give the arrangement a finished appearance, as well as assistance in the provision of a secure support.

The base member previously mentioned includes a rectangular bar 60 to which the legs 38 are secured, which bar 60 is adapted to engage the lower portion 59 of the unit seated thereon, and a plate 61 may be secured to the bar 60, projecting a slight distance above the lower edge of the unit so as to provide a finished appearance at this point. Ordinarily, a bottom sheet 62 will be provided in the base section 37 so as to close in the lower end of the lower unit as shown in Fig. 5.

Since the broiler unit will ordinarily not be used except in conjunction with an oven unit above it, the arrangement shown in Fig. 7 will be used for seating the oven and broiler units together. In this case, the upper portion of the broiler unit is of proper size to receive the downwardly depending edge 59 of the oven unit and thus maintain the two units in proper alignment. In those cases in which a broiler unit is placed underneath an oven unit the air for combustion may be allowed to rise through the passages 34 and 35 at the sides of the broiler unit, in which cases the bottom plate 62 on the base member 37 may be eliminated. It is also possible to operate the oven by drawing air through the door 36 which is in the lower portion of the back of the oven. In such cases, the plate 62 may be used on the base member 37 so as to seal the lower portion of the broiler unit, and when this is done the entrance of air may be controlled entirely by manipulation of the door 36.

The oven and broiler doors may be supported in any suitable manner, but that illustrated in the drawings is a desirable arrangement including the hinges 63 and latching devices 64. If desired also, a thermometer 65 may be provided in each oven door for indicating the exact temperature within the oven.

It will ordinarily be desirable to bring the burner pipe 19 out through the front portion of the oven unit so that it can be conveniently connected on to the outside gas supply pipes as shown in Figs. 1 and 2. This is, of course, optional with the designer.

Referring particularly to Figs. 5, 7 and 8, there are illustrated the bars 66 and 67 extending along the inside lower portions of the oven section. The baffle plates 20 of the false bottom have their end portions pivoted in these bars 66 and 67. For this purpose, the bars 66 and 67 are provided with vertical slots 68 reaching downwardly from the upper faces of the bars, the bearings for the baffle plates being provided by the lower ends of said slots. An L-shaped sheet 69 seats over the upper portion of each of the bars 66 and 67 and its lower edge terminates adjacent to the pivotal positions of the baffle plates so as to hold said baffle plates in place.

There is provided a longitudinally extending slot in the lower portion of the bar 66, and a plate 70 slides back and forth in said slot. This plate 70 has a series of notches 71 in its lower edge, which notches engage the cranks 72 by means of which the baffle plates are rocked.

While I have herein illustrated and described only a single embodiment of the features of my present invention, still it will be understood that I do not limit myself to said embodiment except as I may do so in the claims.

I claim:

1. In a stove adapted for the use of fuels giving products of combustion either heavier or lighter than air, the combination with a closed oven, of a combustion chamber beneath the same, a burner in said combustion chamber, passages for delivering air through the sides of said chamber to the burner, heating passages leading upwardly from said chamber along the sides of the oven to a point above the bottom of the oven, discharge passages leading downwardly from said passages along the sides of the oven and the combustion chamber to a discharge connection at the bottom of the oven, other discharge passages leading away from the upper ends of the heating passages, and means for closing the last mentioned passages for the purpose of directing all the products of combustion downwardly and out of the heating passages, substantially as described.

2. In a stove adapted for the use of fuels giving products of combustion either heavier or lighter than air, the combination with an oven, of a combustion chamber beneath the same, a burner in the combustion chamber, there being openings for the delivery of air into said combustion chamber to the burner, heating passages leading upwardly from the combustion chamber along the sides of the oven to a point above the bottom of the oven, discharge passages leading downwardly along the sides of the oven and the combustion chamber to a point of discharge lower than the flame of the burner, other discharge passages leading away from the upper portions of the heating passages, and means for controlling the flow of gases out of the heating passages by either set of discharge passages as desired, substantially as described.

3. In a stove adapted for the use of fuels giving products of combustion either heavier or lighter than air, the combination with a closed oven, of a combustion chamber beneath the same, a burner in said combustion chamber, passages for delivering air through the sides of said chamber to the burner, heating passages leading upwardly from said chamber along the sides of the oven to a point above the bottom of the oven, discharge passages leading downwardly from said passages along the sides of the oven and the combustion chamber to a discharge connection at the bottom of the oven, other discharge passages leading away from the upper ends of the heating chambers, means for closing the last mentioned passages for the purpose of directing all the products of combustion downwardly and out of the heating passages, a sectional baffle plate located between the burner and the bottom of the oven, and means for moving the sections thereof for the purpose of adjusting the baffling action, substantially as described.

4. A sectional stove or the like comprising in combination a broiler unit and a superimposed independent oven unit, the broiler unit including a U-shaped broiler compartment open at its top, a door giving access to the front of said broiler compartment, there being suitable passages for the delivery of air upwards at the sides of the broiler compartment to points of discharge near the top of the broiler unit, the oven unit comprising an oven section adapted for the use of fuels giving products of combustion either heavier or lighter than air and having a closed oven, a burner beneath the oven and above the lower edge of the oven unit, the oven unit being open below the burner thereof whereby the burner may receive air delivered upwardly through the passages of the broiler unit, and whereby the heat from the burner is operable within the broiler unit, heating passages leading upwardly from the burner at the sides of the oven to a point above the bottom of the oven, discharge passages leading downwardly from said passages along the sides of the oven to a discharge connection at the back of the oven unit, other discharge passages leading away from the upper ends of the heating passages, and means for closing the last mentioned passages for the purpose of directing all the products of combustion downwardly and out of the heating passages, the lower portion of the oven unit being of proper size and contour to seat upon and be supported in a substantially air tight manner by the upper portion of the broiler unit, substantially as described.

5. A sectional stove or the like comprising in combination a broiler unit and a superimposed independent oven unit, the broiler unit including a U-shaped broiler compartment open at its top, a door giving access to the front of said broiler compartment, there being suitable passages for the delivery of air upwards at the sides of the broiler compartment to points of discharge near the top of the broiler unit, the oven unit comprising an oven section, a burner beneath the oven and above the lower edge of the oven unit, the oven unit being open below the burner thereof, whereby the burner may receive air delivered upwardly through the broiler unit, and whereby the heat from the burner is operable within the broiler unit, heating passages leading upwardly from the burner at the sides of the oven to a point above the bottom of the oven, and discharge passages in communication with said heating passages, the lower portion of the oven unit being of proper size and contour to seat upon and be supported in a substantially air tight manner by the upper portion of the broiler unit, substantially as described.

6. A sectional stove or the like comprising in combination a broiler unit and a superimposed oven unit, the broiler unit including a broiler compartment open at its top, a door giving access to the front of said broiler compartment, and suitable passages for the delivery of air to the top of the broiler compartment, the oven unit comprising an oven section, a burner beneath the oven and above the lower edge of the oven unit, heating passages leading upwardly from the burner at the sides of the oven to a point above the bottom of the oven, and discharge passages in communication with said heating passages, the lower portion of the oven unit being of proper size and contour to seat upon and be supported in a substantially air tight manner by the upper portion of the broiler unit, substantially as described.

7. A sectional stove or the like comprising in combination two superimposed oven units, each of said units being open at its bottom and having an oven section, a burner beneath the oven and above the lower edge of the oven unit, heating passages leading from the burner upwardly at the sides of the oven to a point above the bottom of the oven, discharge passages in communication with said heating passages, and an opening for the admission of air into the lower portion of each oven unit, each oven unit having its lower edge portion of proper size and contour to seat upon and be supported by the upper portion of the other oven unit in a substantially air tight manner, substantially as described.

STEPHEN S. THOMAS.